United States Patent [19]

Witten

[11] 4,406,462
[45] Sep. 27, 1983

[54] SELF-ALIGNING MECHANICAL FACE SEAL

[75] Inventor: Raymond L. Witten, Tulsa, Okla.

[73] Assignee: Hughes Tool Company, Houston, Tex.

[21] Appl. No.: 301,162

[22] Filed: Sep. 11, 1981

[51] Int. Cl.³ .................. F16J 15/34; F16J 15/54; H02K 5/10

[52] U.S. Cl. .................. 277/93 SD; 277/39; 277/40; 277/41; 277/93 R; 310/87

[58] Field of Search ............. 310/87; 277/3, 40, 41, 277/42, 88, 89, 81 R, 93 SD, 93 R, 97, 98, 38, 39

[56] References Cited

U.S. PATENT DOCUMENTS

| | | | |
|---|---|---|---|
| 1,363,378 | 12/1920 | Vuilleumier | 277/81 X |
| 2,772,373 | 11/1956 | Howe | 310/90 |
| 2,964,339 | 12/1960 | Macks | 277/3 X |
| 3,165,323 | 1/1965 | Hamano | 277/89 X |
| 3,179,425 | 4/1965 | Andersen | 277/93 X |
| 3,369,137 | 2/1968 | Sanger | 310/87 |
| 3,502,919 | 3/1970 | Boyd et al. | 310/87 |
| 3,934,956 | 1/1976 | Pitner | 308/174 |
| 4,281,839 | 8/1981 | Schoenmeyr | 277/93 SD |

*Primary Examiner*—John Petrakes
*Assistant Examiner*—Lloyd D. Doigan
*Attorney, Agent, or Firm*—Robert A. Felsman; James E. Bradley

[57] ABSTRACT

A mechanical face seal for a submersible pump has features to prevent it from radial movement due to shaft misalignment. The seal includes an annular stationary face carried by the structure of the pump. A rotating seal member is carried by the shaft and urged into rotating contact with the stationary face. A guide member is mounted to the wall structure and has a portion that slidingly engages the rotating seal member to restrain the rotating seal member from radial movement. The rotating seal member is carried by the shaft independently of radial movement of the shaft.

3 Claims, 3 Drawing Figures

SELF-ALIGNING MECHANICAL FACE SEAL

BACKGROUND OF THE INVENTION

Large volume submersible pumps, commonly used in oil well production, have a submersible electrical motor that rotates a shaft. The shaft extends through a seal section into a centrifugal pump for rotating the pump. In the seal section, there are several partitions through which the shaft passes. At the entrance and exit of the seal section and in the partitions, mechanical face seals are mounted to seal the interior from exterior well fluid.

A typical mechanical face seal has an annular stationary member that is mounted to the wall structure. A rotating seal member is coupled to the shaft to rotate with the shaft. The rotating seal member has a face that is urged into contact with the stationary face by means of a coil spring. Normally, the rotating seal member is not rigidly mounted to the shaft, rather is mounted by means of a elastomeric barrier and coil spring.

Although not rigidly mounted, the rotating seal member will vibrate radially to some extent if the shaft is out of alignment due to wear on the sleeve bushings. The radial movement of the rotating seal face against the stationary face reduces the life of the seal.

SUMMARY OF THE INVENTION

A mechanical face seal is provided in this invention of a type that will self-align and maintain alignment with the stationary seal face even if the shaft becomes misaligned. The rotating seal member is coupled to the shaft and rotates with the shaft, but is mounted independently of any radial movement of the shaft. The seal includes a stationary annular seal face mounted to the wall structure. The rotating seal member is mounted to the shaft by means of a coil spring and an elastomeric barrier. The inner diameter of the rotating seal member is greater than the diameter of the shaft so that it will not move radially with the shaft. A guide member is stationarily mounted to the wall structure and extends outwardly over the rotating seal member. The rotating seal member has a cylindrical exterior surface that fits inside the guide member to restrain it from rotation.

DESCRIPTION OF THE PREFERRED EMBODIMENT

Figure 2:
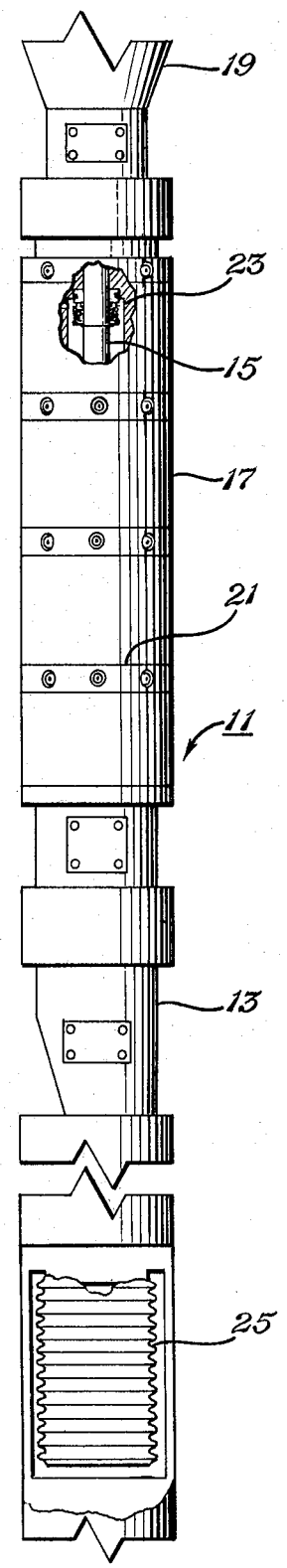
FIG. 2 is a side view, partially in section, of portions of a submersible pump.

Referring to FIG. 2, a submersible pump 11 is shown partially. Submersible pump 11 includes an electrical motor 13 which rotates a shaft 15. Shaft 15 extends through a seal section 17 and into a centrifugal pump 19. A number of partitions 21 are located in the seal section, defining separate chambers. Mechanical face seals 23 seal the shaft 15 at each partition 21 and also at the ends of the seal section 17. The motor 13 and the seal section 17 are filled with a lubricating oil. A bellows 25, shown located below motor 13, equalizes the pressure of the interiors of the motor 13 and seal section 17 with the exterior well fluid pressure.

Figure 3:
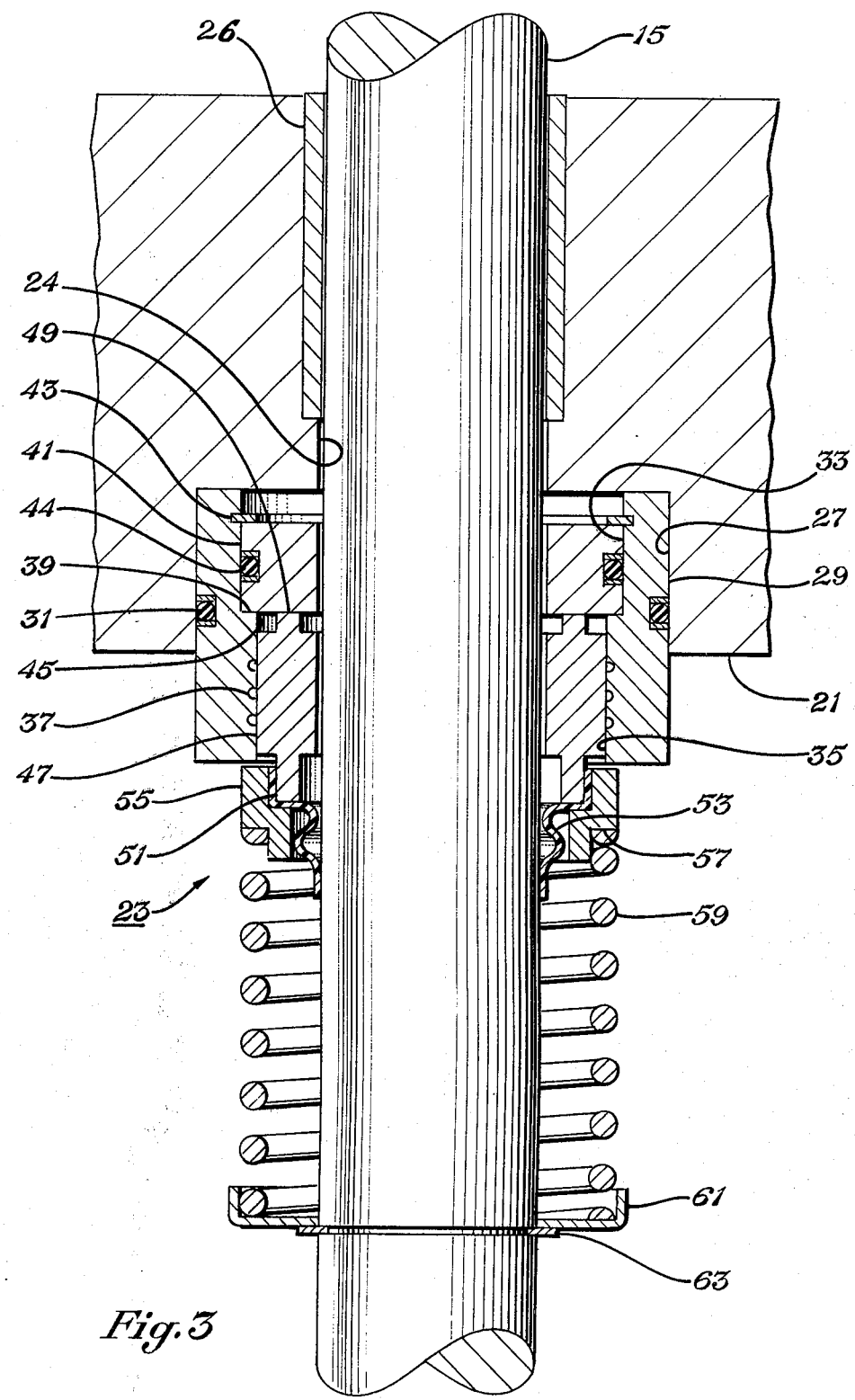
FIG. 3 is an enlarged view of the mechanical face seal used in the submersible pump of FIG. 2.

Some or all of the partitions 21 and ends of seal section 17 will have seals 23 as shown in FIG. 3. Each partition 21 and end of seal section 17 has a passage extending through it for receiving shaft 15. Bushings 26 are located in the passage 24 to serve as bearings and maintain shaft 15 in alignment. In the partitions 21 and seal section 17 ends that use a seal 23 as shown in FIG. 3, a cylindrical cavity 27 will be formed on one side concentric with and forming an enlarged portion of passage 24. A guide member 29 is frictionally retained within cavity 27 by close fitting reception.

Guide member 29 is tubular, with a cylindrical exterior surface having an o-ring seal 31 for sealing against cavity 27. Guide member 29 protrudes from partition 21 a selected distance. The interior of guide member 29 includes a bore portion 33 that is cylindrical and concentric with shaft 15. The interior of guide member 29 also includes a bore portion 35 that is concentric with bore portion 33 but of slightly less diameter. A plurality of circumferential grooves 37 may be formed on the cylindrical surface of bore portion 35. The different diameters of the bore portion 33 and bore portion 35 result in a shoulder 39.

A stationary seal member 41 is tightly secured within the guide member bore portion 33, with one edge abutting shoulder 39. A retaining ring 43 is secured within a groove on the other side of stationary seal member 41 for retaining the stationary seal member. An o-ring 44 is located within a groove on the outer cylindrical surface of stationary seal member 41 for sealing within bore 33. Stationary seal member 41 is a tubular member having an inner diameter that is larger than the diameter of the shaft 15, resulting in an annular clearance. Stationary seal member 41 is normally of ceramic and has an annular face 45 facing away from partition 21.

A rotating seal member 47, usually of carbon, is carried within the bore portion 35 of the guide member 29. Rotating seal member 47 has a cylindrical exterior that is in close rotating reception within bore portion 35. Rotating seal member 47 has an annular face 49 that extends inwardly into rotating sliding contact with the stationary seal member face 45. Rotating seal member 47 is a tubular member with an inner diameter larger in diameter than the shaft 15, resulting in an annular clearance between rotating seal member 47 and shaft 15. Rotating seal member 47 has a annular wall 51 that extends past the guide member 29.

An elastomeric barrier or boot 53 of resilient material has an inner end that fits tightly over the annular wall 51. Boot 53 is tubular and has another end that fits snugly about shaft 15. A metal collar 55 extends over boot 53, securing boot 53 to the annular wall 51 of the rotating seal member 47. An annular shoulder 57 on collar 55 faces away from partition 21. A coil spring 59 is compressed between annular shoulder 57 and a flange 61. A retaining ring 63 located within a groove in shaft 15 retains flange 61 with shaft 15.

In operation, the motor will rotate shaft 15 to drive the pump 17. Flange 61, coil spring 59, collar 57, and boot 53 serve as mounting means to cause rotating seal member 47 to rotate with shaft 15 but independent of any radial movement of shaft 15. The face 49 of rotating seal member 47 will be urged by spring 59 to rotate against the stationary seal member face 45 to provide primary sealing. Boot 53 and the seal faces 45 and 49 prevent liquid from flowing around shaft 15 through passage 24. Grooves 37 serve as secondary seal means should leakage past faces 45 and 49 occur. Normally there will be little pressure differential across partitions 21 from the interior to the exterior due to the bellows 25 (FIG. 2), but pressures up to 20 psi (pounds per square inch) may be encountered due to thermal increases and pressure fluctuations. Rotating seal member 47 will rotate inside the stationary guide member 29, which serves as guide means to prevent radial movement of the rotating seal member 47, due to shaft 15 misalignment.

Figure 1:
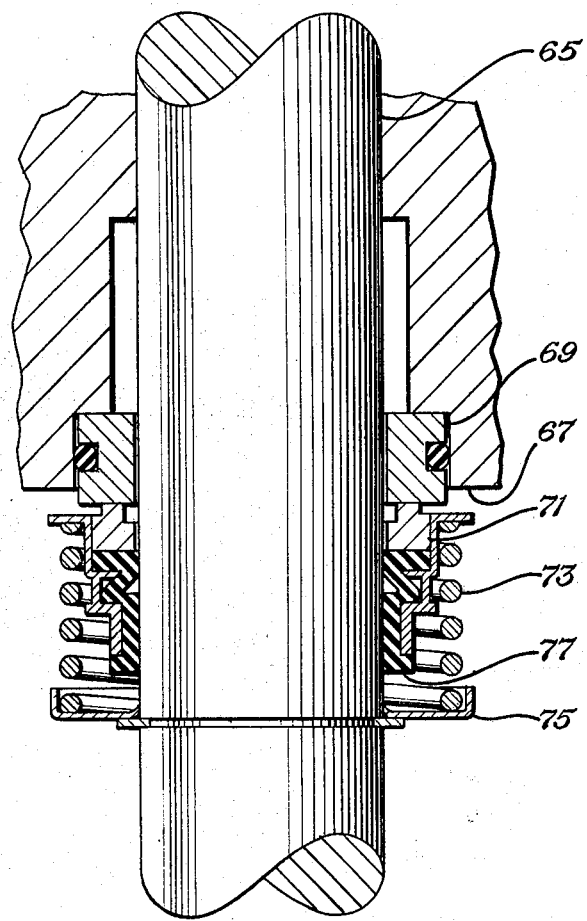
FIG. 1 is a cross-sectional view of a prior art mechanical face seal.

A prior art mechanical face seal used in submersible pumps is shown in FIG. 1. In the prior art seal, shaft 65 passes through partition 67. A stationary seal member 69 is mounted to each partition 67. A rotating seal member 71 is coupled to shaft 69 by means of coil spring 73, which is compressed by a flange 75. Rotating seal member 71 has a larger inner diameter than shaft 65. A boot 77 encircles shaft 65 and is urged sealingly against the rotating seal member 71.

In the operation of the prior art embodiment, any vibration that is transmitted from shaft 65 through spring 73 and boot 77 to the rotating seal member 71 will cause the rotating seal member to move radially. There is no exterior guide structure that is stationary with partition 67 and in sliding contact with rotating seal member 71 to prevent radial movement of rotating seal member 71.

The invention has significant advantages. The stationary guide member serves as guide means to prevent radial movement of the rotating seal member, should the shaft become misaligned. This increases the life of the seal without adding appreciably to the complexity. Secondary sealing is provided between the guide member and rotating means should leakage past the faces occur.

While the invention has been shown in only one of its forms, it should be apparent to those skilled in the art that it is not so limited but is susceptible to various changes and modifications without departing from the spirit of the invention.

I claim:

1. In a submersible pump of the type having an electrical motor with a shaft extending through wall structure of a seal section to rotate a pump, an improved seal means for sealing the shaft, comprising in combination:
   a tubular guide member rigidly mounted to the wall structure and having an inner bore through which the shaft extends; the inner bore having a plurality of parallel circular grooves;
   a tubular stationary seal member rigidly mounted in the bore of the guide member and having an annular face;
   a rotating seal member having an outer cylindrical wall rotatably carried in the bore of the guide member and an inner diameter through which the shaft extends that is larger in diameter than the shaft, the rotating seal member having an annular face that engages the face of the stationary seal member; the outer cylindrical wall forming with the grooves seal means for preventing leakage should leakage past the faces occur;
   a coil spring encircling the shaft and compressed between a flange secured to the shaft and the rotating seal member to urge the faces into contact with each other and to rotate the rotating seal member with the shaft; and
   a tubular elastomeric member having one end extending sealingly around the shaft and another end sealingly engaging the rotating seal member.

2. In a submersible pump of the type having an electrical motor with a shaft extending through wall structure of a seal section to rotate a pump, an improved seal means for sealing the shaft, comprising in combination:
   an annular stationary seal member rigidly carried by the wall structure;
   a tubular rotating seal member having an annular face, an outer cylindrical wall, and an inner diameter through which the shaft extends that is larger than the diameter of the shaft;
   spring means for coupling the rotating seal member to the shaft for rotation therewith and for urging the face of the rotating seal member into the face of the stationary seal member; and
   a guide member rigidly carried by the wall structure and having an inner cylindrical wall for rotatably and slidably receiving the outer wall of the rotating seal member; one of the walls having a plurality of spaced-apart, parallel grooves formed perpendicular to the axis of the shaft for preventing leakage should leakage past the faces occur.

3. In a submersible pump of the type having an electrical motor with a shaft extending through wall structure of a seal section to rotate a pump, an improved seal means for sealing the shaft, comprising in combination:
   a tubular guide member rigidly mounted to the wall structure and having an inner bore through which the shaft extends;
   a tubular stationary seal member of ceramic material having an outer cylindrical wall rigidly mounted in the bore of the guide member and having an annular flat face;
   seal means between the bore of the guide member and the stationary seal member for preventing leakage;
   a rotating seal member of carbon material having an outer cylindrical wall rotatably and slidably carried in the bore of the guide member and an inner diameter through which the shaft extends that is larger in diameter than the shaft, the rotating seal member having a flat annular face of smaller outer diameter than the outer cylindrical wall of the rotary seal member and that engages the face of the stationary seal member;
   a coil spring encircling the shaft and compressed between a flange secured to the shaft and the rotating seal member to urge the faces into contact with each other and to rotate the rotating seal member with the shaft; and
   a tubular elastomeric member having one end extending sealingly around the shaft and another end sealingly engaging the rotating seal member.

* * * * *